(12) United States Patent
Teneze

(10) Patent No.: US 12,241,962 B2
(45) Date of Patent: Mar. 4, 2025

(54) METHOD FOR DETERMINING THE CALIBRATION DATA OF AN AIRBORNE GONIOMETRY APPARATUS

(71) Applicant: BULL SAS, Les Clayes-sous-bois (FR)

(72) Inventor: Bernard Teneze, La Roque d'Antheron (FR)

(73) Assignee: BULL SAS, Les Clayes-sous-Bois (FR)

( * ) Notice: Subject to any disclaimer, the term of this patent is extended or adjusted under 35 U.S.C. 154(b) by 330 days.

(21) Appl. No.: 17/862,867

(22) Filed: Jul. 12, 2022

(65) Prior Publication Data

US 2023/0016513 A1 Jan. 19, 2023

(30) Foreign Application Priority Data

Jul. 13, 2021 (EP) .................................... 21305980

(51) Int. Cl.
*G01S 13/46* (2006.01)
*G01S 13/02* (2006.01)

(52) U.S. Cl.
CPC ....... *G01S 13/46* (2013.01); *G01S 2013/0245* (2013.01); *G01S 2013/468* (2013.01)

(58) Field of Classification Search
CPC .. G01S 1/022; G01S 13/46; G01S 2013/0245; G01S 2013/468; G01S 3/023
See application file for complete search history.

(56) References Cited

U.S. PATENT DOCUMENTS

2004/0189524 A1  9/2004  Saucier
2022/0276391 A1*  9/2022  Teneze ................... G01S 3/023

FOREIGN PATENT DOCUMENTS

CN  111273224 A  6/2020

OTHER PUBLICATIONS

European Search Report issued in EP21305980.1 dated Mar. 21, 2022 (8 pages).
Dinoi, et al., "Direction finding of ground based emitters from airborne platforms", Radar Conference, 2008, IEEE (pp. 1-6).

* cited by examiner

*Primary Examiner* — Nader Bolourchi
(74) *Attorney, Agent, or Firm* — ARC IP Law, PC; Joseph J. Mayo

(57) ABSTRACT

The invention relates to a method for determining calibration data, for a goniometry apparatus comprising an antenna array, from several sets of calibration data. The sets are associated with a measured angular position and include an amplitude datum and a phase datum measured by each antenna. The method includes calculating an estimated calibration data set and normalizing the data set measured by providing as many normalized data sets as there are antennas for each measured position. The method includes calculating a candidate data set by interpolating the measured data sets at the measured positions and previously normalized with respect to the phase measured by the antenna, and selecting the candidate data set whose phase reference has the highest energy. The invention relates to a computer program and an apparatus implementing the method, a calibration table obtained by the method and a goniometry apparatus calibrated with the method.

12 Claims, 3 Drawing Sheets

METHOD FOR DETERMINING THE CALIBRATION DATA OF AN AIRBORNE GONIOMETRY APPARATUS

This application claims priority to European Patent Application Number 21305980.1, filed 13 Jul. 2021, the specification of which is hereby incorporated herein by reference.

BACKGROUND OF THE INVENTION

Field of the Invention

The invention relates to a method for determining the calibration data of an airborne goniometry apparatus. It also concerns a computer program and an apparatus implementing such a method, a calibration table obtained by such a method and a goniometry apparatus calibrated with such a method.

The field of the invention is the field of calibration of airborne goniometry apparatuses.

Description of the Related Art

An airborne goniometry apparatus generally consists of an array of antennas, also called antenna array, and at least one receiver connected to said array of antennas. It is used to detect radiofrequency transmitters located at ground or sea level, and more generally at a lower altitude that is overflown by the vehicle transporting said airborne goniometry apparatus.

In order to determine the position of the transmitter of a radio signal received by the goniometry apparatus, the latter determines the frequency of said received signal and measures the value of a predetermined magnitude. Then, the measured value is compared with reference values stored in a predetermined calibration table for said frequency, each associated with an angular position. By identifying, in the calibration table associated with the frequency of the signal, the reference value closest to the measured value, it is possible to determine the angular position of the received radio signal transmitter, being it then possible to geolocate the latter. According to one embodiment, the measured magnitude is a covariance matrix, and the angular position is given by a pair of angles: a bearing angle ("bearing" hereinafter), an elevation angle ("elevation" hereinafter).

The calibration table is predetermined during a calibration phase for a plurality of angular positions.

According to a first solution, the calibration table can be obtained in a laboratory, and in particular in an anechoic chamber. This solution allows obtaining a complete calibration table with a constant angular pitch. However, the calibration values obtained with this first solution are not accurate because they do not correspond to the real conditions of use of the goniometry apparatus.

According to an alternative solution, the calibration table can be determined in-flight. This solution makes it possible to obtain more accurate calibration values because they are closer to the real conditions of use. However, this solution does not allow obtaining a complete and balanced calibration table because the trajectory of the air carrier with the goniometry apparatus on board is not completely predictable, particularly because of drifts related to the winds for example.

One aim of the invention is to solve at least one of the above-mentioned shortcomings.

Another aim of the invention is to provide a solution for determining calibrating data for an airborne goniometry apparatus that allows obtaining a calibration table that is at the same time, more accurate, complete and balanced.

BRIEF SUMMARY OF THE INVENTION

One or more embodiments of the invention makes it possible to achieve at least one of these aims by means of a computer-implemented method for determining calibration data for an airborne goniometry apparatus comprising an antenna array of several antennas, from several calibration data sets measured in-flight by said goniometry apparatus, each associated with a measured angular position and comprising an amplitude datum and a phase datum measured by each antenna of said antenna array at said measured position, said method comprising, for an estimated angular position, a phase of calculating an estimated calibration data set and comprising the following steps:

for each measured position, normalizing the data set measured at said measured position, with respect to the phase data measured by each antenna, said normalizing providing as many normalized data sets as there are antennas for each measured position;

for each antenna, calculating a candidate data set by interpolating the measured data sets at said measured positions and previously normalized with respect to the phase measured by said antenna;

selecting, as the estimated calibration data set, the candidate data set whose phase reference has the highest energy among said candidate data sets.

Thus, the method according to one or more embodiments of the invention makes it possible to obtain, by interpolation, calibration data for one or more of the angular positions for which no calibration data has been measured. This allows the construction of a complete and well-balanced calibration table with regard to angular positions.

Furthermore, the method according to one or more embodiments of the invention makes it possible to calculate calibration data for angular positions, by interpolation of calibration data measured in-flight, which makes it possible to obtain more accurate calibration data and closer to reality compared to a calibration performed in an anechoic chamber.

In addition, and more importantly, the method according to one or more embodiments of the invention allows interpolation to be performed without using one single phase reference for all estimated angular positions. Thus, for each estimated angular position, the phase reference used for interpolation can potentially be different. For example, for a first estimated position the phase reference can be a first antenna, and for a second estimated position the phase reference can be a second antenna. Furthermore, in the method according to one or more embodiments of the invention, the phase reference used will always be the one with the highest energy level. Thus, the method according to one or more embodiments of the invention makes it possible to obtain, for each estimated angular position, estimated calibration data which are more accurate because they are less affected or tainted by noise which would be due to a phase reference whose energy is too low. Consequently, the calibration data obtained by the method according to one or more embodiments of the invention are more accurate.

The measured data set for an angular position comprises, for each antenna, an amplitude datum and a phase datum measured by said antenna at said measured position, in response to a calibration signal emitted by a calibration transmitter. The amplitude datum and the phase datum measured by an antenna can form a complex vector, whose real part is formed by the amplitude datum and the imaginary part by the phase datum. In this case the measured data set for a position is formed by as many complex vectors as there are antennas in the antenna array, each vector being associated with one antenna.

In at least one embodiment, "angular position" is understood to mean a position defined by a bearing angle and a site angle. The angular position of the goniometry apparatus is the relative position of said goniometry apparatus with respect to the transmitter of a radio frequency signal. In other words, the angular position corresponds to the angular position of reception of the radio frequency signal.

In at least one embodiment, "aerial carrier" is understood to mean any flying vehicle or aircraft, such as an airplane, helicopter, airship, balloon, drone, etc.

Advantageously, in one or more embodiments, the calculation phase can include a step of calculating, for the estimated position, a covariance matrix, from the estimated data set.

This covariance matrix makes it possible to obtain calibration data that is independent of the emitting power of the transmitter. Thus, in one or more embodiments, the calibration data obtained can be used to detect radio transmitters, regardless of the emitting power of these transmitters.

The covariance matrix may comprise a vector representative of the reception difference between the antennas of the antenna array taken in pairs. The difference vector can have a real part and an imaginary part.

In general, for at least one angular position, in one or more embodiments, the calculation phase can comprise any reference magnitude calculated from the data set calculated for said position. This reference magnitude can be a covariance matrix as described above but can also be any other magnitude.

Furthermore, in one or more embodiments, the calculation phase may comprise, for at least one, in particular each, candidate data set, a step of calculating the energy of said candidate data set.

Such a step of calculating the energy of a candidate data set may comprise the following operations:
  calculating the energy associated with each antenna in the candidate data set; and
  calculating the energy of said candidate data set based on the energy associated with each antenna.

The energy associated with, or captured by an antenna, can be calculated according to any known formula, and in particular by calculating the modulus of the complex vector associated with said antenna and formed by the amplitude datum and the phase datum.

The energy of the candidate data set can be calculated according to any known or predetermined relationship taking as input the energy associated to each antenna. In particular, in one or more embodiments, the energy of the candidate data set can be calculated as an average of the energies associated with all the antennas in that data set.

In at least one embodiment, the calculation phase can be implemented for a plurality of estimated positions to build a calibration table comprising a multitude of angular positions according to a predetermined angular distribution.

The angular distribution of the angular positions of the calibration table can use a constant angular pitch so that all the angular positions, taken in pairs, are separated by an angular pitch of the same value.

The angular distribution of the positions of the calibration table can use a variable angular pitch, which can, for example, be a function of the frequency of the radio signal. For example, as the frequency of the radio signal decreases, the angular pitch can be finer and, on the contrary, as the frequency of the radio signal increases, the angular pitch can be larger. It is therefore possible to adapt the granularity of the calibration table based on the measured frequency.

The calibration table may only comprise estimated positions, or a combination of estimated and measured positions.

The calibration table can comprise only estimated calibration data for estimated positions. In other words, the calibration table comprises only estimated positions.

Alternatively, in one or more embodiments, the calibration table can comprise estimated calibration data for estimated positions and measured calibration data for measured positions. In other words, the calibration table comprises estimated positions and measured positions.

Advantageously, in one or more embodiments, the calibration table comprises angular positions distributed according to a constant angular pitch, at least for each frequency of the radio signal.

Thus, in one or more embodiments, it is possible to foresee a constant angular pitch for the same frequency and to modify the angular pitch for all or only part of the measurement frequencies.

The same angular pitch can be used for at least two, and in particular all, frequencies. Alternatively or additionally, in one or more embodiments, different angular pitches can be used for at least two, and in particular all, frequencies.

In any case, at least one embodiment of the invention allows the granularity of the calibration table to be determined with greater freedom.

For at least one estimated position, the interpolation may take into account only the measured calibration data sets for the adjacent measured positions among which said estimated position can be found.

Alternatively, in one or more embodiments, for each estimated position the estimated calibration data set can be calculated by taking into account measured calibration data sets for adjacent measured positions and for other measured positions, and potentially for all measured positions.

For at least one estimated position, the interpolation can be performed by any interpolation function.

According to at least one embodiment, the interpolation can be performed by the interpolation function GRIDDATA, in MATLAB.

The method according to one or more embodiments of the invention can further comprise an acquisition phase, in-flight, of calibration data sets for a plurality of measured angular positions, for at least one frequency.

This calibration phase is performed before the first iteration of the calculation phase and allows measuring the data that will be used during the calculation phase.

During this acquisition phase, the goniometry apparatus is on board by an airborne carrier and a calibration transmitter, for example, disposed on the ground, emits calibration signals. In each measurement angular position and for each frequency, the calibration signal is received by each antenna of the antenna array of the goniometry apparatus and each antenna of the antenna array provides a pair of data, or a complex data vector, formed by an amplitude datum and a phase datum received by said antenna.

According to at least one embodiment of the invention, there is provided a computer program comprising computer instructions which whereupon executed by a computer implement the calculation phase of the method according to any one of the preceding claims.

The computer program can be programmed in any computer language such as C, C++, JAVA, Python, MATLAB, etc.

According to at least one embodiment of the invention, there is provided a calibration table for an airborne goniometry apparatus obtained by the method according to the invention.

The calibration table may comprise a set of calibration data for at least one estimated angular position, and in particular for a multitude of estimated angular positions.

The calibration table may further comprise a set of calibration data for at least one measured angular position, in particular for a multitude of measured angular positions.

The angular positions of the calibration table can be separated by a fixed or variable angular pitch, for example, depending on the frequency of the radio signal emitted by the transmitter as described above.

Typically, the calibration table may include the equivalent of each of the features disclosed herein before in connection with the method according to the invention, and which are not repeated here for the sake of brevity.

Preferably, in one or more embodiments, the calibration table can comprise for each angular position and each frequency, a reference magnitude, such as a covariance matrix, calculated from the data set associated with said angular position at said frequency.

According to at least one embodiment of the invention, there is provided a data processing device configured to implement all the steps of the calculation phase of the method according to the invention.

The device according to one or more embodiments of the invention can be any computing device that can execute a computer program, such as a computer, a server, a processor, a programmable electronic chip, etc.

The device according to one or more embodiments of the invention can be a physical machine or a virtual machine.

The device according to one or more embodiments of the invention may comprise a computer program according to the invention.

According to at least one embodiment of the invention, there is provided an airborne goniometry apparatus calibrated by the method according to the invention.

The airborne goniometry apparatus according to one or more embodiments of the invention may comprise a device according to one or more embodiments of the invention.

The airborne goniometry apparatus according to one or more embodiments of the invention may comprise a computer program according to one or more embodiments of the invention.

BRIEF DESCRIPTION OF THE DRAWINGS

Other benefits and features shall become evident upon examining the detailed description of an entirely non-limiting embodiment, and from the enclosed drawings in which.

DETAILED DESCRIPTION OF THE INVENTION

It is understood that the embodiments disclosed hereunder are by no means limiting. In particular, it is possible to imagine variants of the invention that comprise only a selection of the features disclosed hereinafter in isolation from the other features disclosed, if this selection of features is sufficient to confer a technical benefit or to differentiate the invention with respect to the prior state of the art. This selection comprises at least one preferably functional feature which lacks structural details, or only has a portion of the structural details if that portion is only sufficient to confer a technical benefit or to differentiate the invention with respect to the prior state of the art.

In the figures the same reference has been used for the features that are common to several FIGURES.

Figure 1A:
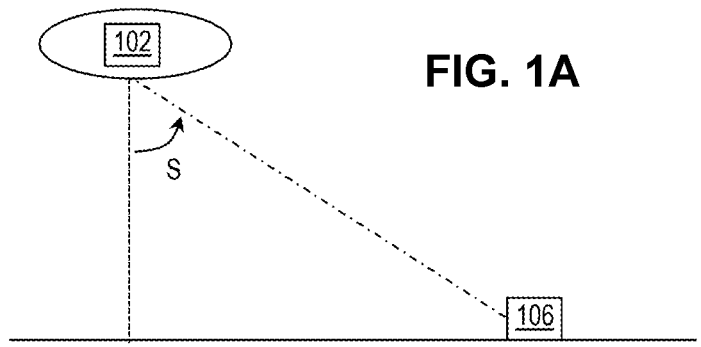
FIGS. 1A and 1B are schematic depictions of a non-limiting exemplary embodiment of a configuration for calibrating an airborne goniometry apparatus which can be used in the present invention.
Figure 1B:
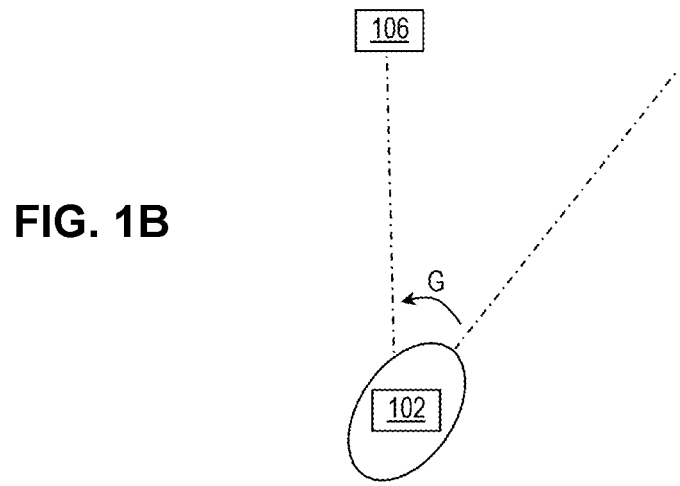

FIGS. 1A and 1B are schematic depictions of a non-exemplary embodiment of a configuration for calibrating an airborne goniometry apparatus, seen from a side view and a top view, respectively.

FIGS. 1A and 1B schematically show a goniometry apparatus 102 transported by an aircraft, such as for example an airplane, and helicopter, an airship, a balloon, etc.

A calibration transmitter 106, of known position, is used to calibrate the airborne goniometry apparatus 102. The calibration transmitter 106 can be stationary or mobile. The calibration transmitter 106 can for example be disposed on the ground.

The calibration of the goniometry apparatus 102 is performed as follows. A calibration signal of known frequency is sent by the calibration transmitter 106 to the goniometry apparatus 102. The goniometry apparatus 102 measures the reception response of each antenna in the antenna array for the calibration signal, namely a complex vector whose real part is formed by an amplitude datum and whose imaginary part is formed by the phase datum. The measured data are stored associated with the known emission frequency, and the known angular position of the calibration transmitter 106 relative to the airborne goniometry apparatus 102.

For each angular position of the calibration transmitter 106, in one or more embodiments, with respect to the airborne goniometry apparatus 102, the calibration is repeated for different frequencies, or frequency bands, with a view to scanning an entire broad range of frequencies, in the context of a calibration sequence.

The position of the goniometry apparatus is changed to repeat the calibration at a new angular position so as to scan a range of angular positions, for example along a calibration path.

Thus, in one or more embodiments, at the end of calibration, a calibration data table is obtained. This table comprises for each pair {frequency, angular position} a set of complex vectors, each complex vector corresponding to the response of an antenna of the antenna array to a calibration signal.

According to a non-limiting example according to one or more embodiments of the invention, a reference magnitude can be calculated, for each frequency and each angular position, from the data set associated with said frequency at said angular position. For example, the calculated reference magnitude can be, in an entirely non-limiting manner, a covariance matrix indicating the reception differences between said receiving antennas, that is, between the complex vectors.

The angular position of the calibration transmitter 106 with respect to the goniometry apparatus 102 can be given by a combination of two angles, namely:
- a bearing angle, denoted G, depicted in FIG. 1B, which corresponds to the angle, in the horizontal plane, between on the one hand the direction connecting the aircraft and the calibration transmitter 106, and on the other hand a reference direction, for example magnetic north; and
- an elevation angle, denoted S, depicted in FIG. 1A, corresponding to the angle formed between on the one hand the vertical direction between the goniometry apparatus 102 (and thus the aircraft) and the ground, and on the other hand the direction connecting the goniometry apparatus 102 (and thus the aircraft) and the calibration transmitter 106.

These angles can be provided or calculated from measured data, by sensors equipping the goniometry apparatus 102 or the aircraft, such as, for example:
- a GPS module indicating the position of the aircraft,
- an altimeter indicating the altitude of the aircraft, and
- optionally an inertial unit indicating the attitude, that is, the spatial orientation of the aircraft with the goniometry apparatus 102 on board.

Each calibration signal emitted by the calibration generator 106 can be a signal burst.

As noted above, in one or more embodiments, the goniometry apparatus 102 comprises an antenna array formed by several antennas. During calibration, for each angular position and for each calibration signal, each antenna receives and measures a pair of data, namely an amplitude datum and a phase datum. Thus, for each angular position and for each calibration signal, the goniometry apparatus measures a data set formed by as many data pairs {Amplitude, Phase} as there are antennas in the antenna array. This set of measured data can then be used to calculate a calibration datum such as a covariance matrix, for example, between the measurements made by all the antennas of the antenna array.

When the calibration is performed in-flight, the measured angular positions do not necessarily correspond exactly to those desired. Thus, at the end of an acquisition phase, the measured angular positions are not distributed in the desired way, for example, with a desired angular pitch. In other words, in one or more embodiments, in-flight calibration does not allow obtaining a complete, even and balanced calibration table with a constant angular pitch because the trajectory of the air carrier with the goniometry apparatus on board is not totally predictable, particularly because of drifts related to winds for example.

At least one embodiment of the invention makes it possible to overcome this drawback by proposing a method for calculating calibration data for at least one unmeasured angular position, called "estimated angular position" or "estimated position", by interpolating data measured in-flight for several measured angular positions, also called "measured position" herein.

Figure 2:
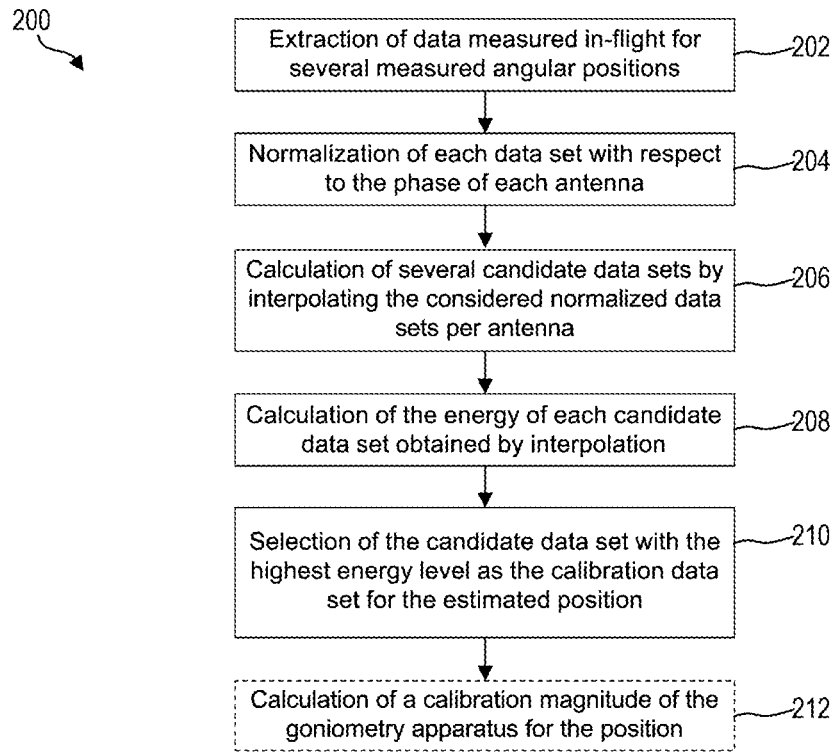
FIG. 2 is a schematic depiction of a non-limiting exemplary embodiment of a method according to the invention for determining calibration data of an airborne goniometry apparatus.

FIG. 2 is a schematic depiction of a non-limiting example of a method according to one or more embodiments of the invention.

The method 200 of FIG. 2 allows calculating calibration data for an estimated angular position, for which no calibration data measured in-flight are available, from in-flight measured calibration data for several measured angular positions at the same frequency.

Preferably, in one or more embodiments, the measured angular positions whose calibration data are used to calculate the calibration data of the estimated position are angular positions close to, or around, or surrounding said estimated position.

The method 200 depicted in FIG. 2 is described for an estimated position. The method 200 can be repeated as many times as desired to calculate, individually, calibration data for several estimated positions.

The method 200 includes a step 202 in which measured data for several measured angular positions are extracted. These measured data will be used to calculate by interpolation calibration data for an estimated angular position. For example, in step 202, the measured data for M positions $POSM^1$-$POSM^M$ are extracted. Considering that the antenna array comprises K antennas, the data measured for each position $POSM^m$ correspond to a set of K data pairs, each pair corresponding to one of the K antennas and comprising an amplitude datum and a phase datum measured by said antenna. Thus, in one or more embodiments, the measured data set for the position $POSM^m$ corresponds to:

$$POSM^m = \{(AM_1^m, PH_1^m), \ldots, (AM_k^m, PH_k^m), \ldots, (AM_K^m, PH_K^m)\}$$

wherein $1 \leq m \leq M$ and $1 \leq k \leq K$

In step 204, the measured data set for each measured position $POSM^m$ is normalized with respect to the phase measured by each antenna in the antenna array. Normalization of the data set with respect to the phase of an antenna can be performed by dividing the phase data measured by all antennas by the phase data of said antenna. Thus, in this step 204, K data sets are obtained for each measured position $POSM^m$. For example, for the data set $POSM^m$, measured for the "m" measured position, the following K normalized data sets are obtained:

$$POSM^{m/1} = \{(AM_1^m, 1), \ldots, (AM_k^m, PH_k^m/PH_1^m), \ldots, (AM_K^m, PH_K^m/PH_1^m)\},$$

normalized with respect to the antenna phase 1

$$POSM^{m/k} = \{(AM_1^m, PH_1^m/PH_k^m), \ldots, (AM_k^m, 1), \ldots, (AM_K^m, PH_K^m/PH_k^m)\},$$

normalized with respect to the antenna phase k $$POSM^{m/K} = \{(AM_1^m, PH_1^m/PH_K^m), \ldots, (AM_k^m, PH_k^m/PH_K^m), \ldots, (AM_K^m, 1)\},$$

normalized with respect to the antenna phase K

In step 206, K candidate datasets are calculated by interpolation for the estimated position, considering the normalized antenna-by-antenna data.

In other words, in one or more embodiments, for all measured positions, the data normalized with respect to the antenna 1 are considered first: $POSM^{1/1}$-$POSM^{M/1}$. These normalized data $POSM^{1/1}$-$POSM^{M/1}$ are used to calculate by interpolation a candidate data set, denoted $POSE^{/1}$, for the estimated position POSE. The candidate data set $POSE^{/1}$ is thus obtained by taking antenna 1 as phase reference. The same operation is repeated with the data set normalized with respect to antenna 2: $POSM^{1/2}$-$POSM^{M/2}$ to calculate a candidate data set $POSE^{/2}$ obtained by taking as phase reference the antenna 2, and so forth so that step 206 provides K candidate data sets $POSE^{/1}$-$POSE^{/K}$, each obtained by taking as phase reference one of the antennas of the antenna array. Note that each candidate data set $POSE^{/k}$, wherein $1 \leq k \leq K$, provides as many data pairs (AM, PH) as there are antennas in the antenna array so that the obtained candidate data set with respect to antenna k can be:

$$POSE'^k = \{(AM_1'^k, PH_1'^k), \ldots, (AM_k'^k, PH_k'^k), \ldots, (AM_K'^k, PH_K'^k)\}$$

wherein $1 \leq k \leq K$

In this step 206, each candidate data set is calculated using an interpolation function, such as for example the GRID-DATA function, in MATLAB.

In step 208, the energy of each candidate data set $POSE'^k$, wherein $1 \leq k \leq K$, is calculated. This energy can be calculated in different ways.

According to at least one embodiment, the energy of each candidate data set $POSE'^k$ is calculated as follows. First, in one or more embodiments, the energy of each pair of data $(AM_k'^k, PH_k'^k)$ forming the candidate data set is calculated. For each pair of data, the energy can for example correspond to the modulus of the complex vector formed by this pair of data. Then, in one or more embodiments, the energy of the candidate data set $POSE'^k$ can be calculated based on the energy of each data pair forming said candidate data set. For example, the energy of the candidate data set may correspond to the average of the energies of the data pairs forming said candidate data set.

The method 200 then includes a step 210, in which the candidate data set having the highest energy level is selected as the estimated data set for the POSE estimated position.

Optionally, in one or more embodiments, the method 200 may advantageously comprise a step 212 for calculating a calibration magnitude for the estimated position POSE. This calibration magnitude can be a covariance matrix obtained from the estimated data set selected in step 210. Thus, at the end of step 212, a calibration magnitude is obtained by interpolation for an estimated angular position and for a frequency for which no calibration data has been measured in-flight.

The method 200 can be repeated for as many estimated angular positions as desired to build a complete and balanced calibration table in terms of angular positions.

According to at least one embodiment of the invention, such a calibration table can be obtained without using one single phase reference for all estimated angular positions. Thus, for each estimated angular position, the phase reference used for interpolation can potentially be different. Furthermore, according to one or more embodiments of the invention, the phase reference used for each estimated position will always be the one with the highest energy level. Thus, one or more embodiments of the invention makes it possible to obtain, for (each) estimated angular position, estimated calibration data which are more accurate because they are less affected or tainted by noise which would be due to a phase reference whose energy is too low. Consequently, in one or more embodiments, the calibration data obtained by the method according to the invention are more accurate.

Figure 3:
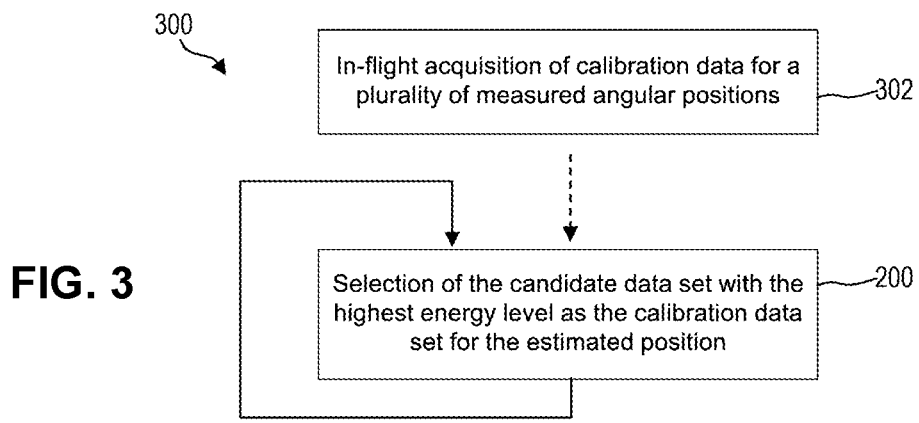
FIG. 3 is a schematic depiction of a non-limiting exemplary embodiment of a method according to the invention for determining a calibration table of an airborne goniometry apparatus according to the invention.

FIG. 3 is a schematic depiction of a non-limiting example of a method according to one or more embodiments of the invention for determining calibration data table of an airborne goniometry apparatus according to one or more embodiments of the invention.

The method 300 of FIG. 3 makes it possible to determine a calibration data table comprising, for a multitude of given angular positions and frequencies, calibration data for an airborne goniometry device.

The method comprises a phase 302 of measuring calibration data for a plurality of measured angular positions. This acquisition phase 302 is performed in the configuration shown in FIGS. 1A and 1B, that is, whereupon the goniometry apparatus is on board an airborne carrier. The acquisition phase provides data for a plurality of angular positions that are not unevenly distributed.

Figure 4A:
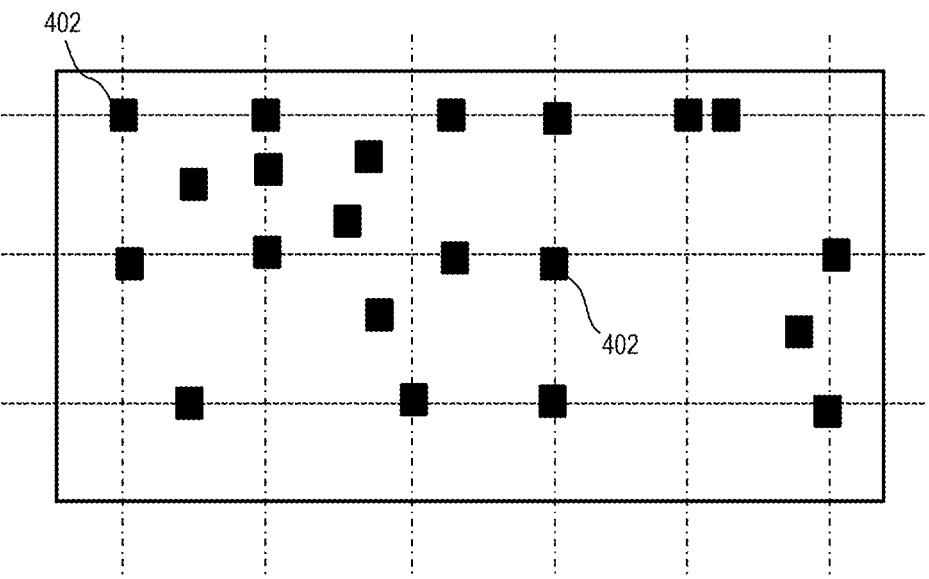
FIGS. 4A and 4B are schematic depictions of calibration tables of a goniometry apparatus according to the invention.

An example of the distribution of measured angular positions 402 is shown in FIG. 4A. Each measured angular position is represented by a rectangle. It can clearly be seen that the angular positions are not evenly distributed, that there are areas where there are no measured angular positions and areas comprising too many measured angular positions.

The method 300 next includes at least one iteration of a calibration data calculation for at least one estimated angular position, based on data measured in-flight during the acquisition phase. In particular, in one or more embodiments, the calculation of estimated calibration data for an estimated position may be performed according to the method 200 of FIG. 2.

Preferably, in one or more embodiments, the method 200 can be repeated for a plurality of angular positions so as to obtain a multitude of angular positions, for which calibration data are available, which are evenly distributed according to a desired constant or variable pitch.

Figure 4B:
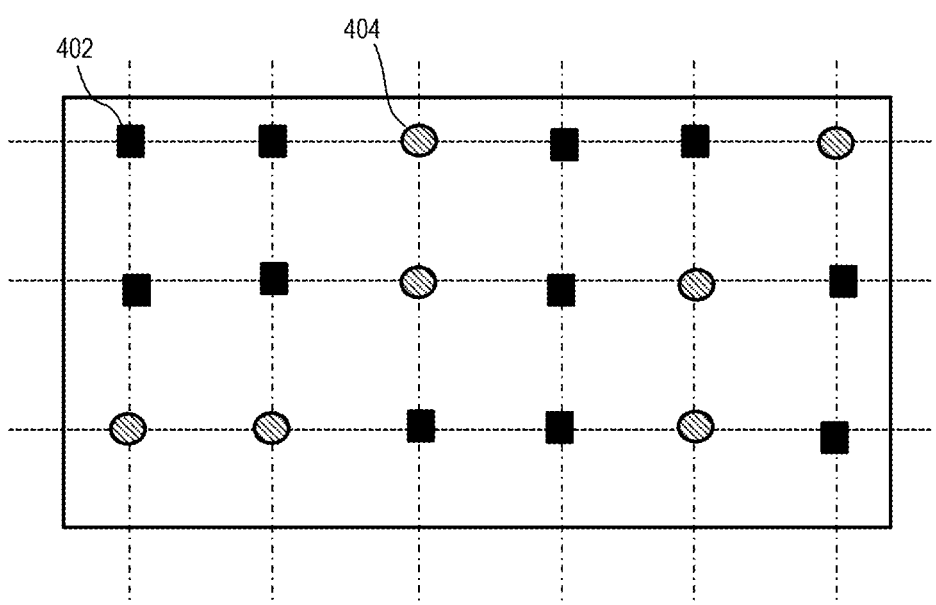

An example of the angular position distribution thus obtained is shown in FIG. 4B. Each measured angular position 402 is represented by a rectangle and each estimated angular position 404 is represented by a circle. It can be clearly seen that in the calibration table in FIG. 4B, the angular positions are evenly distributed and according to a desired, and in particular constant, pitch. Furthermore, all areas are covered and there are no areas for which calibration data are not available.

In the method 300, in one or more embodiments, the acquisition phase is performed before the first iteration of the method 200. The first iteration of the method 200 may be performed after the acquisition phase is complete. Alternatively, in one or more embodiments, the first iteration of the method 200 can be performed/triggered without waiting for the completion of the acquisition phase.

Furthermore, in one or more embodiments, the method 300 can be repeated for each radio frequency involved in the calibration. In this case, the acquisition phase 302 can be common to several or even all radio frequencies.

At least one embodiment of the invention also relates to a data processing device configured to implement all the steps of the method according to one or more embodiments of the invention, and in particular the method 200 of FIG. 2. Such a device, not shown in the FIGURES, may be a computer, server, processor, programmable electronic chip, etc. configured to implement all the steps of the method, for example by virtue of a computer program.

The device according to one or more embodiments of the invention can be a physical machine or a virtual machine.

The invention in one or more embodiments also relates to a goniometry apparatus configured, or comprising a calibration table calculated, by a method according to one or more embodiments of the invention, and in particular by the method 200 of FIG. 2.

Of course, the invention is not limited to the examples detailed herein before given for purposes of illustration and the general scope of the invention is defined in the claims.

What is claimed is:

1. A computer-implemented method for determining calibration data, for an airborne goniometry apparatus comprising an antenna array of several antennas, from several calibration data sets measured in-flight by said airborne goniometry apparatus, each associated with a measured angular position and comprising an amplitude datum and a phase datum measured by each antenna of said antenna array at said measured angular position, said computer-implemented method comprising:

for an estimated angular position, a phase of calculating an estimated calibration data set comprising for each measured angular position, normalizing a calibration data set of said several calibration data sets that are measured at said measured angular position, with respect to the phase datum measured by each antenna of said antenna array, wherein said normalizing provides as many normalized data sets as there are antennas in the antenna array of several antennas for said each measured angular position;

for said each antenna, calculating a candidate data set by interpolating the several calibration data sets that are measured at said each measured angular position and previously normalized with respect to the phase datum measured by said each antenna;

selecting, as the estimated calibration data set, a candidate data set whose phase reference has a highest energy among all candidate data sets from said candidate data set for said each antenna.

2. The computer-implemented method according to claim 1, wherein the phase of calculating comprises calculating, for the estimated angular position, a covariance matrix, from the estimated calibration data set.

3. The computer-implemented method according to claim 1, wherein the phase of calculating comprises, for at least one candidate data set, calculating an energy of said at least one candidate data set, comprising calculating the energy associated with said each antenna in the at least one candidate data set; and calculating the energy of said at least one candidate data set based on the energy associated with said each antenna.

4. The computer-implemented method according to claim 1, wherein the phase of calculating is implemented for a plurality of estimated positions to build a calibration table comprising a multitude of angular positions according to a predetermined angular distribution.

5. The computer-implemented method according to claim 4, wherein the calibration table further comprises only the plurality of estimated positions, or a combination of the plurality of estimated positions and measured positions.

6. The computer-implemented method according to claim 4, wherein the calibration table further comprises the multitude of angular positions distributed following a constant angular pitch.

7. The computer-implemented method according to claim 1, wherein, for at least one estimated angular position, the interpolating takes into account only calibration data sets of said several calibration data sets that are measured for adjacent measured angular positions between which said estimated angular position lies.

8. The computer-implemented method according to claim 1, wherein, for at least one estimated position of each of said estimated angular position, the interpolating is performed by an interpolation function.

9. The computer-implemented method according to claim 1, further comprising a phase of acquiring, in-flight, the several calibration data sets for a plurality of measured angular positions, for at least one frequency.

10. The computer-implemented method according to claim 1, wherein the phase of calculating is implemented by a processing device.

11. A computer program comprising computer instructions which when executed by a computer implement a computer-implemented method for determining calibration data, for an airborne goniometry apparatus comprising an antenna array of several antennas, from several calibration data sets measured in-flight by said airborne goniometry apparatus, each associated with a measured angular position and comprising an amplitude datum and a phase datum measured by each antenna of said antenna array at said measured angular position, said computer-implemented method comprising:

for an estimated angular position, a phase of calculating an estimated calibration data set comprising for each measured angular position, normalizing a calibration data set of said several calibration data sets that are measured at said measured angular position, with respect to the phase datum measured by each antenna of said antenna array, wherein said normalizing provides as many normalized data sets as there are antennas in the antenna array of several antennas for said each measured angular position;

for said each antenna, calculating a candidate data set by interpolating the several calibration data sets that are measured at said each measured angular position and previously normalized with respect to the phase datum measured by said each antenna;

selecting, as the estimated calibration data set, a candidate data set whose phase reference has a highest energy among all candidate data sets from said candidate data set for said each antenna.

12. An airborne goniometry apparatus comprising:
an antenna array of several antennas;
wherein said airborne goniometry apparatus is calibrated by a computer-implemented method for determining calibration data from several calibration data sets measured in-flight by said airborne goniometry apparatus,
wherein each calibration data set of said several calibration data sets is associated with a measured angular position and comprises an amplitude datum and a phase datum measured by each antenna of said antenna array at said measured angular position,
wherein the computer-implemented method comprises for an estimated angular position, a phase of calculating an estimated calibration data set comprising for each measured angular position, normalizing a calibration data set of said several calibration data sets that are measured at said measured angular position, with respect to the phase datum measured by each antenna of said antenna array, wherein said normalizing provides as many normalized data sets as there are antennas in the antenna array of several antennas for said each measured angular position;

for said each antenna, calculating a candidate data set by interpolating the several calibration data sets that are measured at said each measured angular position and previously normalized with respect to the phase datum measured by said each antenna;

selecting, as the estimated calibration data set, a candidate data set whose phase reference has a highest energy among all candidate data sets from said candidate data set for said each antenna.

* * * * *